(12) United States Patent
Kiest, Jr.

(10) Patent No.: US 6,705,801 B1
(45) Date of Patent: Mar. 16, 2004

(54) APPARATUS AND METHOD FOR PROVIDING ACCESS TO BURIED PIPELINE

(75) Inventor: Larry W. Kiest, Jr., Ottawa, IL (US)

(73) Assignee: Blue Sky Forever, Inc., Warrenville, IL (US)

( * ) Notice: Subject to any disclaimer, the term of this patent is extended or adjusted under 35 U.S.C. 154(b) by 72 days.

(21) Appl. No.: 10/225,374

(22) Filed: Aug. 21, 2002

(51) Int. Cl.[7] ................................................ F16L 55/18
(52) U.S. Cl. ....................... 405/184.1; 405/156; 138/97
(58) Field of Search ........................... 405/184.1, 184.3, 405/184.4, 156, 157, 154.1; 138/97; 285/197

(56) References Cited

U.S. PATENT DOCUMENTS

| | | | | |
|---|---|---|---|---|
| 3,649,055 A | * | 3/1972 | Nilsen | 285/197 |
| 4,894,521 A | * | 1/1990 | Evans | 285/197 |
| 4,966,397 A | * | 10/1990 | McKinnon | 285/197 |
| 5,020,832 A | * | 6/1991 | Coblentz | 285/197 |
| 5,360,241 A | * | 11/1994 | Gundy | 285/197 |
| 5,364,207 A | * | 11/1994 | Reber et al. | 405/184.1 |
| 5,601,315 A | * | 2/1997 | Bunger et al. | 385/197 |
| 5,613,807 A | * | 3/1997 | Reber et al. | 405/184.1 |
| 5,624,206 A | * | 4/1997 | Cohen et al. | 405/184.1 |
| 6,017,064 A | * | 1/2000 | Harrington | 285/197 |

\* cited by examiner

*Primary Examiner*—Frederick L. Lagman
(74) *Attorney, Agent, or Firm*—McKee, Voorhees & Sease, P.L.C.

(57) ABSTRACT

A method for providing access to a buried pipe includes excavating the ground to expose the pipe. An access assembly comprising a curved plate and an upstanding access pipe is pressed onto the buried pipe with the curved plate embracing the buried pipe and the access pipe extending upwardly. The curved plate is sealed to the buried pipe and a hole is cut in the buried pipe to provide communication from the access pipe into the buried

5 Claims, 3 Drawing Sheets

APPARATUS AND METHOD FOR PROVIDING ACCESS TO BURIED PIPELINE

BACKGROUND OF THE INVENTION

The present invention relates to an apparatus and method for providing access to a buried pipeline.

Conventional sewer lines include a main pipeline which extends along the street in a direction parallel to the street. Each home has a lateral pipeline that extends from the home and connects to the main pipeline.

It is often desirable to provide a clean out to the lateral pipeline adjacent the main sewer line. Many lateral pipelines have been buried without such a clean out. In order to provide such a clean out it is necessary to make a wide and extensive excavation so that persons can enter the excavation and attach the clean out pipe to the lateral pipe. This results in considerable disruption of the soil and the yard around the home.

Therefore a primary object of the present invention is the provision of an improved apparatus and method for providing access to buried pipeline.

A further object of the present invention is the provision of an apparatus and method for providing access to buried pipelines which creates a minimum of disruption of the soil.

A further object of the present invention is the provision of an apparatus and method for providing access to buries pipeline which does not require a person to enter the excavation to place the access pipe or clean out pipe to the buried pipeline.

A further object of the present invention is the provision of a device which is efficient in operation, economical in cost, and simple in construction.

BRIEF SUMMARY OF THE INVENTION

The foregoing objects may be achieved by a combination including a main sewer pipe located below the surface of the ground and a lateral sewer pipe below the surface of the ground and connected to the main sewer pipe. The lateral pipe includes an interior bore, a surrounding pipe wall, and an outer peripheral surface to the surrounding pipe wall. An access hole is in the surrounding pipe wall of the lateral sewer pipe and provides communication from outside the lateral sewer pipe into the interior bore of the lateral sewer pipe. An access assembly includes a saddle surrounding a portion of the outer peripheral surface of the lateral pipe and an access pipe extending upwardly therefrom. The access pipe includes a lower end extending through the saddle and having an upper end adjacent the surface of the ground. The access pipe also has an internal bore providing communication from the upper end thereof to the lower end thereof to the access hole in the lateral sewer pipe. This results in the internal bore of the access pipe providing access from the upper end thereof to the interior bore of the lateral sewer pipe.

This access can be used for clean out purposes, but it can also be used for making internal repairs to the lateral sewer pipe. It is possible to invert liner tubes into the lateral sewer pipe through the access pipe in a manner that is commonly used for repairing sewer pipe.

The saddle of the access assembly comprises a curved plate conforming to the outer peripheral surface of the lateral sewer pipe. The outer peripheral surface of the lateral pipe extends in a circle 360°, and the curved plate surrounds more than 180° of the outer peripheral surface of the lateral sewer pipe.

The curved plate comprises a flexible material that permits the curved plate to flex in an outward radial direction and then snap back to its original curved configuration during the connection of the curved plate to the outer peripheral surface of the lateral sewer pipe.

According to another feature of the invention the curved plate includes a concave surface that is substantially concentric to the outer peripheral surface of the lateral sewer pipe. A sealing material provides a fluid tight seal between the concave surface of the curved plate and the outer peripheral surface of the lateral sewer pipe. The sealing material may be a cured resin material. It may be a material that is hydrophilic, hydrophobic, or catalyst activated. It may also be an adhesive, a form of epoxy, or a two-sided tape. It could also be a gasket or a mastic material or any other material that provides a satisfactory seal.

The method for providing access to the interior bore of the sewer pipe buried beneath the surface of the ground is as follows; the ground is first excavated to expose a portion of the lateral sewer pipe. This excavation can be minimal because all that is necessary is to provide a one to two foot diameter access hole in the ground rather than an excavation that is sufficiently large to permit a person to enter the access hole. Next the installer takes an access assembly having a curved plate forming a concave surface and an access pipe having a lower end connected to the curved plate and providing fluid communication through the curved plate. The concave surface of the curved plate is then attached in facing relation over the outer curved surface of the exposed portion of the buried pipe. The concave surface of the curved plate is sealed to the outer curved surface of the exposed portion of the buried pipe. This sealing may be accomplished in a variety of different ways described above, including the use of an uncured sealing material that cures and hardens to form the seal. Other devices such as two sided tape or gaskets could be used to provide the seal. The final step is the cutting of an access hole in the buried pipe wall of the buried pipe, the access hole providing communication between the lower end of the access pipe and the interior bore of the buried pipe so as to provide access to the interior bore of the buried pipe from the upper end of the access pipe through the lower end of the access pipe and the access hole in the buried pipe wall.

According to one feature of the invention the method of attachment comprises using a curved plate that extends slightly greater than 180° of a circle. The curved plate is formed from a resilient material. The attaching step includes forcing the concave surface of the curved plate into contact with the outer curved surface of the buried pipe whereby the concave surface will first flex in an outward radial direction and then will flex in an inward radial direction to retentively embrace the outer curved surface of the buried pipe. This step may be done remotely by the installer from above ground merely by pressing down on the upstanding access pipe to snap the curved plate in retentive engagement over the buried pipe. While this snapping attachment is preferred, a curved plate having less than 180° may also be used.

DETAILED DESCRIPTION OF THE INVENTION

Figure 1:
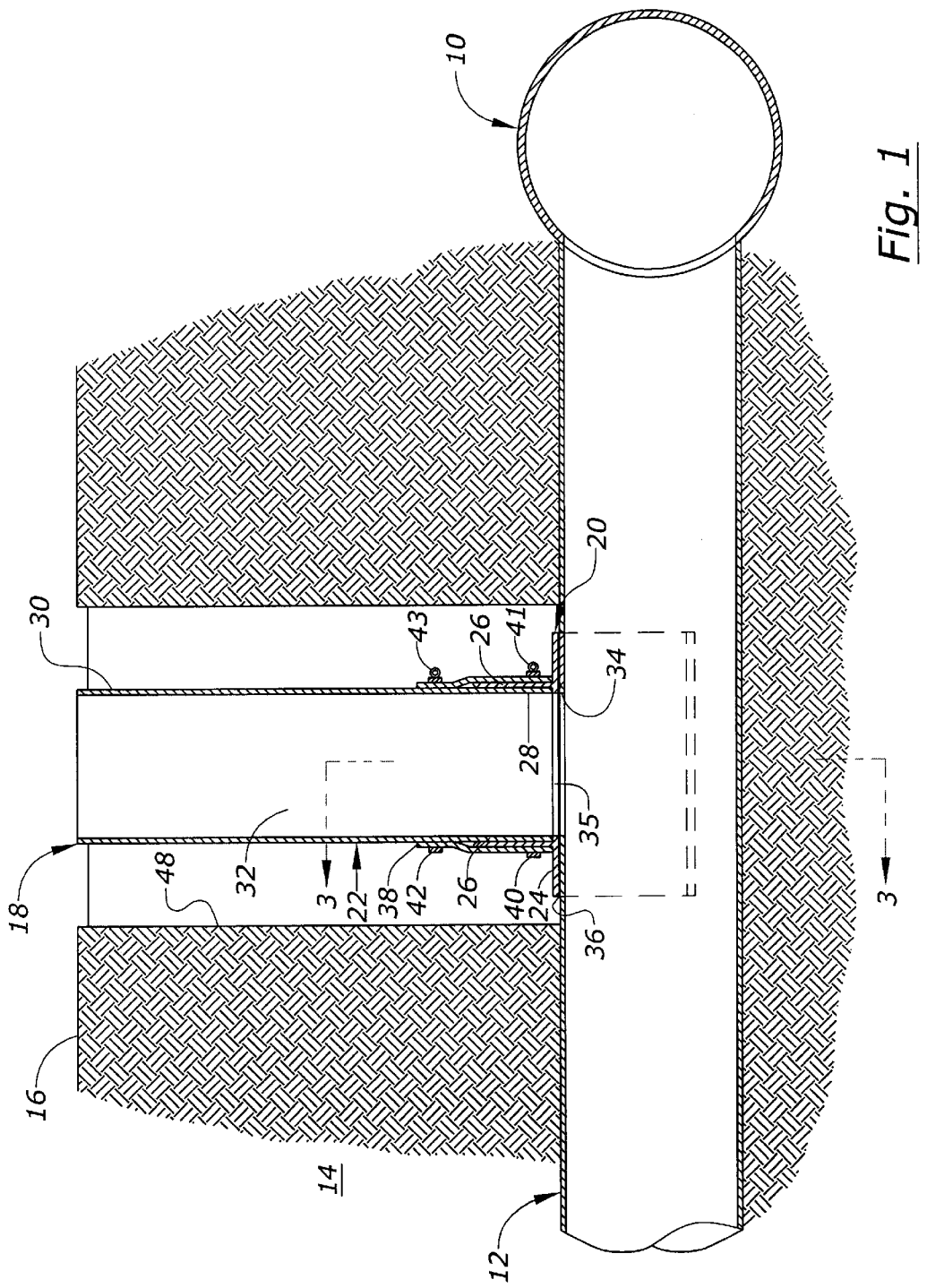
FIG. 1 is a sectional view showing the buried lateral and main sewer pipe and showing the access assembly for providing access to the interior of the lateral sewer pipe.

Referring to the drawings the numeral 10 designates a main sewer line and the numeral 12 designates a lateral sewer line, both of which are buried in the ground 14 which has an upper surface 16.

Figure 2:
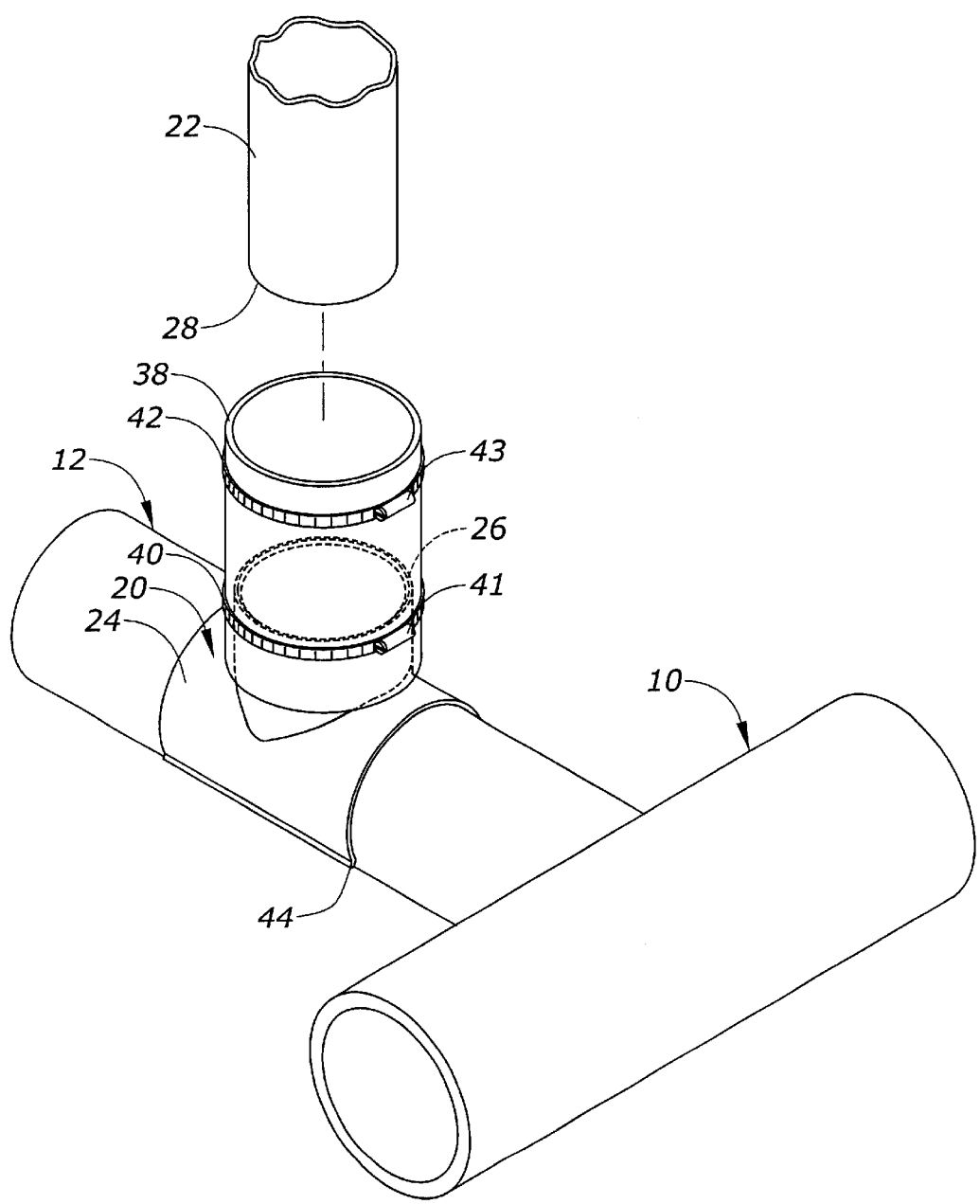
FIG. 2 is a perspective partially exploded view of the access assembly.
Figure 3:
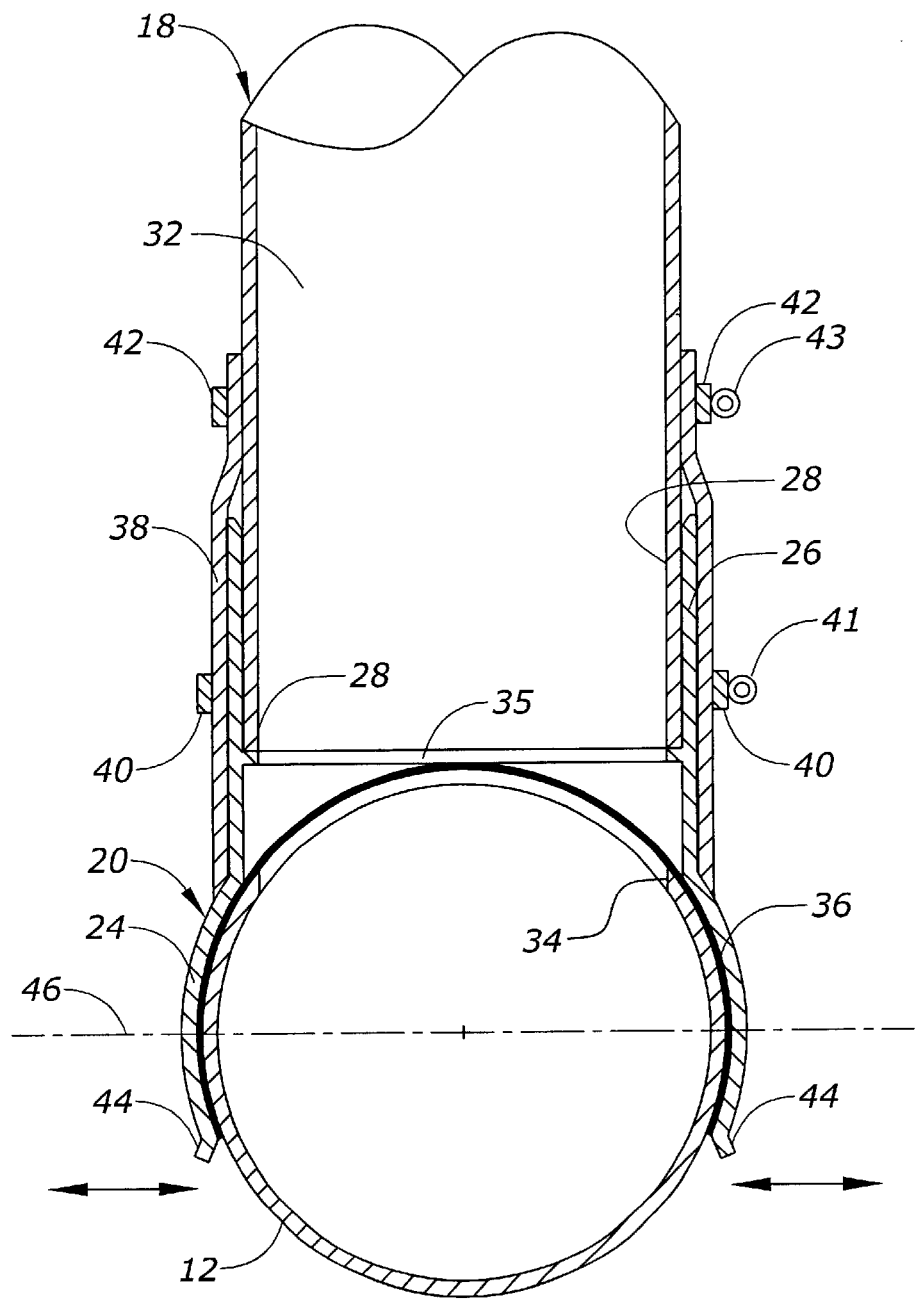
FIG. 3 is a sectional view taken along line 3—3 of FIG. 1.

An access assembly 18 provides access to the interior of the buried lateral sewer pipe 12. Access assembly includes a saddle 20 and an access pipe 22. Saddle 20 includes a curved plate 24 having an upstanding boss 26. The curved plate 24 has a pair of outwardly flared flanges 44 adjacent its lower edges as can be seen in FIGS. 2 and 3. The curved plate 24 extends slightly more than 180° and is made of a flexible resilient material, preferably plastic which can spread in outward radial direction during the time it is being forced over the lateral sewer pipe 12. After having been forced over the lateral sewer pipe 12, the resiliency of the curved plate 24 causes it to snap back into its original configuration so that it retentively engages the outer surface of the lateral sewer pipe 12.

The access pipe 22 includes a lower end 28 which is fitted within the upstanding boss 26, and an upper end which is adjacent the surface 16 of the ground. Extending downwardly through the access pipe 22 is an access pipe bore 32. The diameter of access pipe 30 may approach the diameter of the lateral sewer pipe 12 so as to provide full access to the interior of the lateral sewer pipe 12.

An access opening 34 is cut in the lateral sewer pipe 12 so as to provide communication from the internal access pipe bore 32 into the interior of the lateral sewer pipe 12.

A sealing material 36 provides a fluid tight seal between the concave lower surface of the curved plate 24 and the convex or curved outer surface of the sewer pipe 12. The sealing material may be a cured resin or other cured hardenable material. It also can be a physical seal such as a gasket or two-sided tape or other material.

The lower end 28 of access pipe 22 rests on an annular rib 35 which extends around the inside of the upstanding boss 26. The lower end 28 of the access pipe 22 extends inside the boss 26 and is secured there by a flexible sleeve 38 having clamps 40, 42 extending there around and having clamp screws 41, 43 which can be tightened to secure the attachment of access pipe 22 to the saddle 20. While the flexible sleeve 38 and the clamps 40, 42 are shown, other methods of attachment may be used. For example, the pipe could be attached by an adhesive or other material conventionally used by plumbers in connecting plastic pipe together.

Referring to FIG. 3, the manner in which the saddle 20 snaps over the lateral sewer pipe 12 can be seen. The line 46 represents the diameter of the lateral sewer pipe 12. As can be seen the lower ends and flanges 44 of the curved plates 24 extend beyond the diameter line 46 of lateral sewer pipe 12. When the saddle is pressed downwardly these flanges 44 spread in an outward radial direction and then snap back in place to secure the saddle 20 to the outer surface of the lateral sewer pipe 12. This can be accomplished remotely by merely pressing downwardly on the upper end 30 of the access pipe 22 so as to snap the saddle 20 in place.

In order to install the access assembly 18 the first step is to locate the lateral sewer pipe 12 from above ground. This can be accomplished by various means, among which include the conventional use of a camera that is movable within the main sewer line 10 or the lateral sewer pipe 12 and by sensing the location of the camera from above ground by ultrasonic or other means. Once the lateral sewer pipe is located, an excavation hole 48 is provided. This may be accomplished by numerous boring means such as the use of augers or other materials. However, the preferred method is to use a vacuum excavator manufactured by Vactor Manufacturing under the trade name VACTOR®, at the address of 1621 South Illinois Street, Streator, Ill. 61364. This device excavates a hole and removes the soil from the hole with a minimum of disturbance of the soil. The diameter of hole 48 need be only large enough to permit the insertion of the saddle 20 into the hole, and need be only deep enough to expose a portion of the outer surface of the lateral sewer pipe 12.

When the excavation of the hole is completed, the access assembly 18 is inserted into the hole and pressure is applied on the upper end 30 of the access pipe 22 to force the curved plate 24 and the lower flanges 44 thereon to spread radially outwardly and then snap back into place to secure the saddle 20 to the outer surface of the sewer pipe 12. This all can be done above ground remotely from the location of the lateral sewer pipe and does not require the installer to enter the access hole 48.

Before snapping the saddle 20 in place, a sealing material 36 is placed on the under surface of the saddle 20. The sealing material may be an uncured plastic resin or it can be physical sealing means such as gaskets or double-sided tape. Once the saddle 20 is snapped in place, the sealing material 36 provides a fluid tight seal between the saddle 20 and the sewer pipe 12.

Next a cutting tool is inserted through the access bore 32 into engagement with the outer surface of the lateral sewer pipe 12. An access hole 34 is cut in the outer surface of the lateral sewer pipe 12 thereby providing communication from above ground into the interior of the lateral sewer pipe 12. The preferred machine for making the access opening 34 is a cutting machine manufactured by Milwaukee Tools under the trade name Diamond coring bits, sold in Grainger Catalog at address of 2701 Ogden Avenue, Downers Grove, Ill. 60515.

After the access assembly 18 has been secured in place and the access hole 34 cut, a cap (not shown) is placed over the upper end 30 of the access pipe 22, and the excavated hole 48 is filled in. This provides an access to the interior of the lateral sewer pipe at any time in the future when it is needed merely by removing the cap and using the access bore 32 to gain access to the interior of the lateral sewer pipe 12.

The use of the present invention does not require the operator to make an excavation hole large enough for the operator to enter the hole and work adjacent the buried lateral sewer pipe. Instead the installer works from above ground, and merely inserts the access assembly 18 from a remote position above ground. This minimizes the disturbance of the soil around the access assembly 18 and is quicker and more easily done than prior methods.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention ask further defined in the following claims.

What is claimed is:

1. In combination:

a main sewer pipe located below a surface of the ground;

a lateral sewer pipe below the surface of the ground and connected in fluid communication with the main sewer pipe, the lateral sewer pipe having an interior bore, a surrounding pipe wall, and an outer peripheral surface to the surrounding pipe wall;

an access hole in the surrounding pipe wall of the lateral sewer pipe providing communication from outside the lateral sewer pipe into the interior bore of the lateral sewer pipe;

an excavated hole in the ground providing communication from the access hole in the lateral sewer pipe to the surface of the ground;

an access assembly within the excavated hole and having a saddle surrounding a portion of the outer peripheral surface of the lateral pipe and an access pipe extending upwardly therefrom, the access pipe having a lower end extending through the saddle and having an upper end adjacent the surface of the ground;

the access pipe also having an internal bore providing communication from the upper end thereof to the lower end thereof to the access hole in the lateral sewer pipe, whereby the internal bore of the access pipe provides access from the upper end thereof to the interior bore of the lateral sewer pipe;

the saddle of the access assembly comprising a curved plate conforming to the outer peripheral surface of the lateral sewer pipe, the outer peripheral surface of the lateral sewer pipe extending in a circle 360 degrees, the curved plate surrounding more than 180 degrees of the outer peripheral surface of the lateral sewer pipe;

the curved plate comprising a flexible material that permits the curved plate to flex in an outward radial direction and then snap back to its original curved configuration in response to downward pressure applied to the access pipe from above the surface of the ground during the connection of the curved plate to the outer peripheral surface of the lateral sewer pipe.

2. A combination according to claim 1 wherein the curved plate includes a concave surface that is substantially concentric to the outer peripheral surface of the lateral sewer pipe, a sealing material providing a fluid tight seal between the concave surface of the curved plate and the outer peripheral surface of the lateral sewer pipe.

3. A method for providing access to an interior bore of a lateral sewer pipe buried beneath the surface of the ground, the lateral sewer pipe having a lateral pipe wall surrounding the interior bore and the lateral pipe wall having an outer curved surface, the method comprising:

excavating the ground to create an excavated hole having a lower end exposing a portion of the lateral sewer pipe and an upper end communicating with the surface of the ground;

taking an access assembly having a curved plate forming a concave surface and an access pipe having a lower end connected to the curved plate and providing fluid communication through the curved plate, the access pipe also having an upper end at the upper end of the excavated hole;

applying an uncured sealing material to the concave surface of the curved plate, the uncured sealing material being capable of curing and hardening;

placing the concave surface of the curved plate on the outer curved surface of the exposed portion of the lateral sewer pipe, the concave surface of the curved plate conforming to the outer curved surface of the lateral sewer pipe and the uncured sealing material being between and contacting the curved plate and the lateral sewer pipe;

holding the concave surface of the curved plate against the outer curved surface of the lateral sewer pipe with the uncured sealing material there between until the uncured sealing material cures, hardens, and forms a fluid tight seal between the curved plate and the lateral sewer pipe;

cutting an access hole in the lateral pipe wall of the lateral sewer pipe, the access hole providing communication between the lower end of the access pipe and the interior bore of the lateral sewer pipe, so as to provide access to the interior bore of the lateral sewer pipe from the upper end of the access pipe through the lower end of the access pipe and the access hole in the lateral pipe wall;

the outer curved surface of the lateral pipe extending 360 degrees, the curved plate extending greater than 180 degrees and having sufficient resilience to deform in an outward radial direction and return to its original non-deformed condition in response to a being pressed into contact over the outer curved surface of the lateral pipe;

the holding step further comprising pressing the curved plate over the outer curved surface of the lateral pipe by applying downward pressure on the upper end of the access pipe from above the surface of the ground so that the curved plate cams in an outward radial direction and then returns to its original non-deformed condition to attach the curved plate to the lateral sewer pipe.

4. A method for providing access to an interior bore of a buried pipe buried beneath the surface of the ground, the buried pipe having a buried pipe wall surrounding the interior bore and the buried pipe wall having an outer curved surface, the method comprising:

excavating the ground to expose a portion of the buried pipe;

taking an access assembly having a curved plate forming a concave surface and an access pipe having a lower end connected to the curved plate and providing fluid communication through the curved plate, the access pipe also having an upper end in communication with the surface of the ground;

attaching the concave surface of the curved plate in facing relation over the outer curved surface of the exposed portion of the buried pipe;

sealing the concave surface of the curved plate to the outer curved surface of the exposed portion of the buried pipe;

cutting an access hole in the buried pipe wall of the buried pipe, the access hole providing communication between the lower end of the access pipe and the interior bore of the buried pipe, so as to provide access to the interior bore of the buried pipe from the upper end of the access pipe through the lower end of the access pipe and the access hole in the buried pipe wall;

the concave surface of the curved plate extending greater than 180 degrees of a circle and the curved plate being formed from a resilient material;

the attaching step comprising pressing downwardly on the upper end of the access pipe from above the surface of the ground so as to force the concave surface of the curved plate into contact with the outer curved surface of the buried pipe, whereby the concave surface will first flex in an outward radial direction and then will flex in an inward radial direction to retentively embrace the outer curved surface of the buried pipe.

5. A method according to claim 4 wherein the sealing step comprises placing an uncured sealing material between the concave surface of the curved plate and the outer curved surface of the exposed portion of the buried pipe, and permitting the uncured sealing material to cure harden.

* * * * *